United States Patent
Coleman

(10) Patent No.: US 7,403,906 B2
(45) Date of Patent: Jul. 22, 2008

(54) METHOD AND SYSTEM FOR DELIVERY OF TARGETED COMMERCIAL MESSAGES

(75) Inventor: Thomas E. Coleman, Stillwater, MN (US)

(73) Assignee: iPool Corporation, Roseville, MN (US)

( * ) Notice: Subject to any disclaimer, the term of this patent is extended or adjusted under 35 U.S.C. 154(b) by 0 days.

(21) Appl. No.: 11/381,286

(22) Filed: May 2, 2006

(65) Prior Publication Data

US 2007/0083438 A1    Apr. 12, 2007

Related U.S. Application Data

(63) Continuation of application No. 10/076,903, filed on Feb. 14, 2002, now abandoned, which is a continuation of application No. 09/343,801, filed on Jun. 30, 1999, now abandoned.

(51) Int. Cl.
    *G06Q 30/00*    (2006.01)
(52) U.S. Cl. ............................. 705/14; 705/26; 705/10; 707/10
(58) Field of Classification Search .................. 705/10, 705/14, 26, 27; 707/10
    See application file for complete search history.

(56) References Cited

U.S. PATENT DOCUMENTS

| | | | |
|---|---|---|---|
| 5,353,218 A | 10/1994 | De Lapa et al. | |
| 5,745,882 A | 4/1998 | Bixler et al. | |
| 5,794,210 A | 8/1998 | Goldhaber et al. | |
| 5,822,735 A | 10/1998 | De Lapa et al. | |
| 5,933,811 A | 8/1999 | Angles et al. | |
| 5,974,396 A | 10/1999 | Anderson et al. | |
| 5,999,912 A | 12/1999 | Wodarz et al. | |
| 6,026,369 A | 2/2000 | Capek | |
| 6,032,177 A | 2/2000 | O'Donnell | |
| 6,055,513 A * | 4/2000 | Katz et al. | 705/26 |
| 6,070,147 A * | 5/2000 | Harms et al. | 705/14 |
| 6,119,098 A | 9/2000 | Guyot et al. | |
| 6,134,532 A | 10/2000 | Lazarus et al. | |
| 6,411,992 B1 | 6/2002 | Srinivasan et al. | |
| 6,460,036 B1 * | 10/2002 | Herz | 707/10 |
| 6,546,488 B2 | 4/2003 | Dillon et al. | |
| 6,594,638 B1 | 7/2003 | Feldman et al. | |
| 6,684,194 B1 | 1/2004 | Eldering et al. | |
| 6,721,748 B1 | 4/2004 | Knight et al. | |
| 2004/0117257 A1 | 6/2004 | Haberman et al. | |

FOREIGN PATENT DOCUMENTS

| CA | 2250450 | 4/1999 |
|---|---|---|
| WO | WO-99/12115 A1 | 3/1999 |

* cited by examiner

*Primary Examiner*—Yogesh C. Garg
(74) *Attorney, Agent, or Firm*—Schwegman, Lundberg, & Woessner, P.A.

(57) ABSTRACT

A method for delivery of targeted commercial messages. The method comprises assembling a plurality of potential purchaser profiles in an electronic file for presentation to at least one potential advertiser of goods or services applicable to a substantial portion of the plurality of potential purchasers, developing commercial message selection criteria for selecting from the potential purchasers those suited to receive a specified commercial message contained in a set of commercial messages, applying the commercial message selection criteria to the purchaser profiles to identify the potential purchasers suited to receive specified commercial messages, and presenting over a data network to a potential purchaser identified as suited, the specified commercial messages.

16 Claims, 11 Drawing Sheets

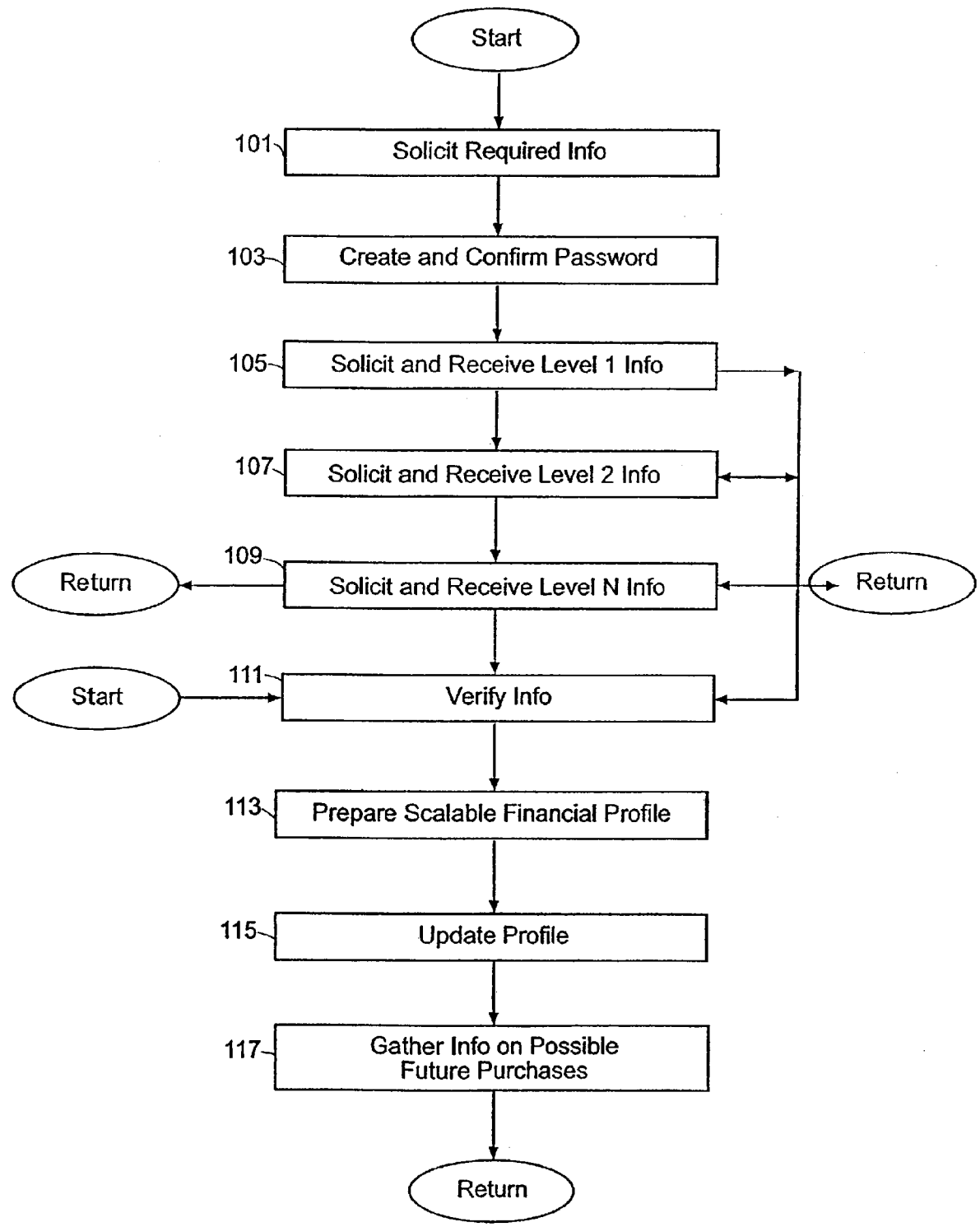

Fig. 5

Account Creation

[ Click here for International Addresses ]  (1)

50 — User Name:

54 — Password:

Confirm Password:

Question:
*Enter a question to ask in case you forget your password*

Answer:
*Enter the answer to the question above*

56 — Email Address

51 — First Name

52 — Middle Name

53 — Last Name

58 — Address

City

State

Zip Code

60 — Phone Number

How did you hear about I-Pool? *(Member referral, Newspaper or Magazine, Television, Employer, Service Provider, Web Site)*

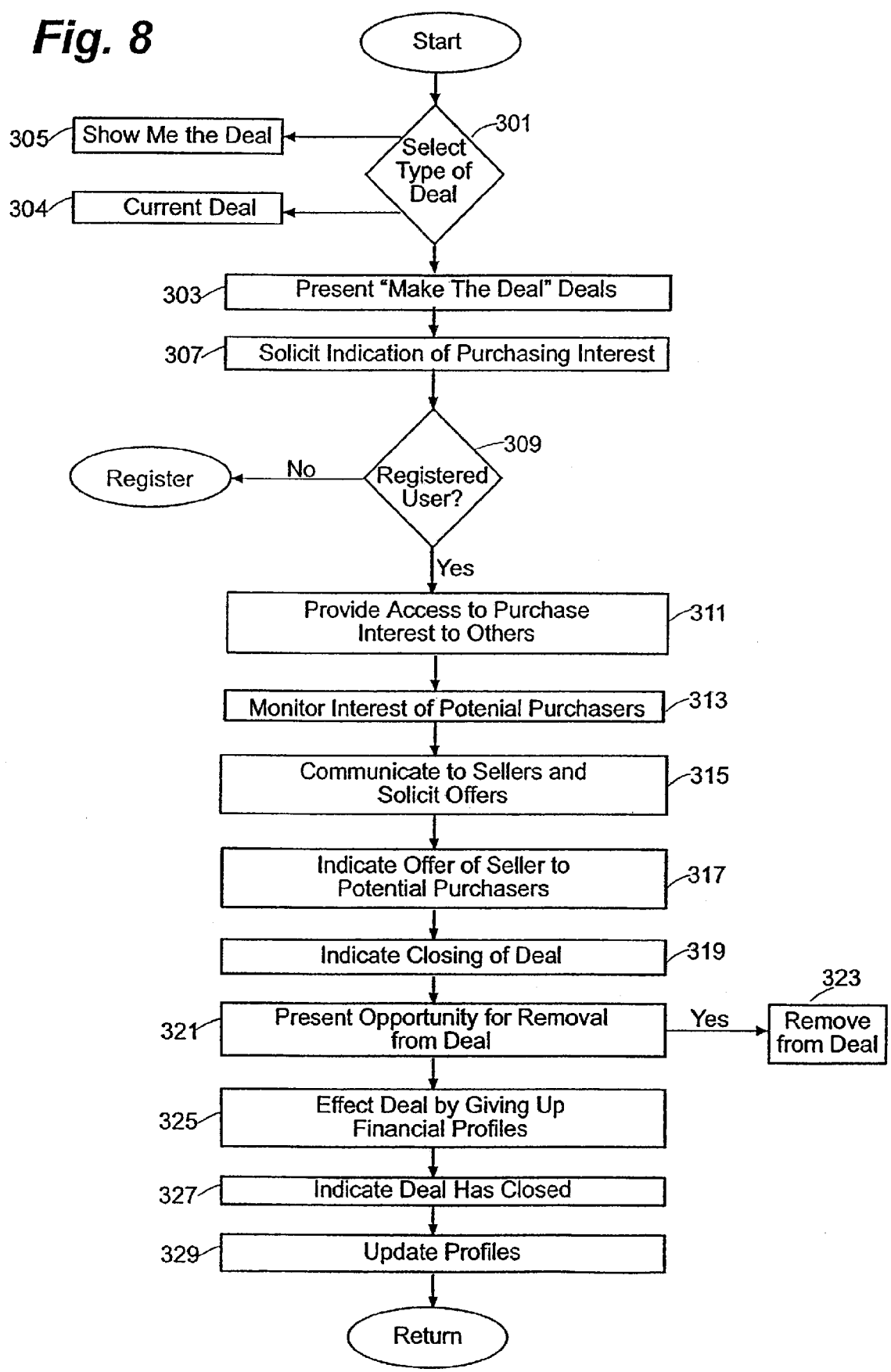

METHOD AND SYSTEM FOR DELIVERY OF TARGETED COMMERCIAL MESSAGES

This application is a continuation under 37 C.F.R. 1.53(b) of U.S. patent application Ser. No. 10/076,903 filed Feb. 14, 2002, now abandoned, which is a continuation of U.S. patent application Ser. No. 09/343,801 filed Jun. 30, 1999 (abandoned), which applications are incorporated herein by reference.

BACKGROUND OF THE INVENTION

1. Field of the Invention

This invention relates to pooling and advertising methods and systems for linking purchasers with sellers of goods or services, as well as targeted commercial messaging. More particularly, this invention relates to methods and systems for aggregating a number of potential purchasers for linking to one or more sellers of goods or services, as well as delivering targeted commercial messages to potential purchasers. The methods and systems may be implemented in computer hardware and software.

2. Background Information

Typical sales strategies involve mass-marketing to the consumers. Advertisers, for instance, use direct mailing to large groups of individuals, television broadcast advertising, and telemarketing to advertise and sell goods and services. Such mass advertising methods can be expensive and ineffective due to the lack of a targeted approach—only a fraction of the persons reached by such mass marketing will be interested in most offerings. Thus, the cost per acquired purchaser or customer is high.

Because advertisers know that only a small percentage of the mass-market audience has a real interest in the product or service being sold, they use entertainment value and content to attract the attention of the more promising potential purchasers. Thus, advertisers may place their advertisements in certain television shows, radio programs, or magazines where they feel a substantial portion of their most likely potential purchasers will see their advertisement. Such advertising strategies may nevertheless be both over-inclusive and under-inclusive, because the advertisements will reach many uninterested people and will miss many potential purchasers.

Information on consumers or potential purchasers can be very important to sellers of goods and services. Telemarketers and advertisers alike benefit from having detailed information about buying interests or capacities of potential purchasers of goods or services. If an advertiser, for instance, can identify and selectively advertise to those potential purchasers who fit a profile of probable purchasers of the advertiser's goods or services, the advertiser can reduce advertising costs by advertising directly to those potential purchasers. In other words, if the advertiser has both information about potential purchasers and more targeted access for its messages, it can achieve more purchasers/customers for the same amount of money. Useful demographic and financial information for such a strategy includes a potential purchaser's financial status, age, residence, family size/configuration, and interests in various goods and services.

If an advertiser has a large amount of demographic and financial information about a potential purchaser, the advertiser can potentially selectively market to the more promising purchasers for a decreased expense per sales transaction. The money saved by the advertiser can, potentially, be used to reduce the price of the good or service to the purchaser. Instead of advertising via radio or television broadcasts to the masses of potential purchasers, the advertiser can concentrate on specific potential purchasers who may be likely to buy a specific good or service and offer favorable pricing.

Although advertisers prefer to have detailed information about potential purchasers of goods or services, the typical potential purchaser would prefer to keep his or her personal and financial information private. There can be a trade-off, therefore, between achieving greater advertising power for an advertiser or seller of goods or services, and protecting the privacy of potential purchasers. Consumers and potential purchasers are concerned about keeping personal and financial information from becoming widely disseminated, both because of privacy concerns and to avoid unwanted solicitation letters and advertisements. These privacy concerns have increased in recent years with the emergence of the "World Wide Web" ("Web") as a widespread source of data.

U.S. Pat. No. 5,794,210 to Goldhaber et al. (the Goldhaber patent) discloses an "attention brokerage" method, which is the "business of brokering the buying and selling of the 'attention' of users." The Goldhaber method allows "users to choose whether they will view an ad or other negatively priced information and receive associated compensation." Goldhaber patent, Abstract. Although the Goldhaber patent does disclose a method that creates an incentive for individual potential purchasers to view advertisements, it does not teach pooling of purchasing power to in association with providing updated and detailed information about potential purchasers to the advertiser or marketer of the goods or service. Other systems exist for on-line sales or auctions of goods or services, but these systems do not aggregate potential purchasers for linking to sellers.

A need exists for a new method and system that enables more efficient, less costly transactions between potential purchasers and sellers of goods or services, and allows sellers of goods and services to decrease their advertising costs. In particular, a method and system for reducing advertising costs per sales transaction is needed. Similarly, a method and system for aggregating a pool of purchasers for linking to sellers is needed. Finally, a need exists for a method and system for targeted delivery of commercial messages.

SUMMARY OF THE INVENTION

One embodiment of the invention is a method for compiling in a host computer system a purchaser profile for inclusion in a pool of purchaser profiles. The method comprises collecting in an electronic file in the host computer system identification and residence location information for at least one potential purchaser, and registering the at least one potential purchaser with the host computer system, collecting in the electronic file profile information provided by the at least one potential purchaser, effecting for the at least one potential purchaser one or more purchase transactions and collecting resulting transaction information in the electronic file, and preparing from at least the information above a profile for the at least one potential purchaser that is updated regularly. In one embodiment, this method may further comprise assembling a plurality of potential purchaser profiles for presentation to a potential seller of goods or services applicable to a substantial portion of the plurality of potential purchasers, and receiving from the potential seller and communicating to the plurality of potential purchasers an offer formulated on the assumption that it will be accepted by a substantial portion of the plurality of potential purchasers and reflecting the resulting economies of scale.

Another embodiment of the invention is a method of aggregating in a host computer system a pool of potential purchasers to respond to an offer for a group purchase. This method comprises collecting in an electronic file in the host computer system identification and residence location information for at least one potential purchaser, and registering the at least one potential purchaser with the host computer system, collecting in the electronic file profile information provided by the at least one potential purchaser, effecting for the at least one potential purchaser one or more purchase transactions and collecting resulting transaction information in the electronic file, assembling a plurality of potential purchaser profiles for presentation to a potential seller of goods or services applicable to a substantial portion of the plurality of potential purchasers, and receiving from the potential seller and communicating to the plurality of potential purchasers an offer formulated on the assumption that it will be accepted by a substantial portion of the plurality of potential purchasers and reflecting the resulting economies of scale.

Another embodiment of the invention is an apparatus for aggregating in a host computer system a pool of potential purchasers to respond to an offer for a group purchase. The apparatus comprises programs to collect in an electronic file in the host computer system identification and residence location information for at least one potential purchaser, and register the at least one potential purchaser with the host computer system, collect in the electronic file profile information provided by the at least one potential purchaser, effect for the at least one potential purchaser one or more purchase transactions and collect resulting transaction information in the electronic file, assemble a plurality of potential purchaser profiles for presentation to a potential seller of goods or services applicable to a substantial portion of the plurality of potential purchasers, and receive from the potential seller and communicate to the plurality of potential purchasers an offer formulated on the assumption that it will be accepted by a substantial portion of the plurality of potential purchasers and reflecting the resulting economies of scale.

Another embodiment of the invention is a method for providing to a host computer system purchaser profile for inclusion in a pool of purchaser profiles. The method of this embodiment comprises sending to the host computer system identification and residence location information of at least one potential purchaser, sending to the host computer system profile information of the at least one potential purchaser, transmitting transaction information to the host computer system that results from an effected purchase transaction of the at least one potential purchaser, and receiving from the host computer system a profile for the at least one potential purchaser resulting from the information from the acts above that is updated regularly.

Another embodiment of the invention is a computer-readable medium containing instructions for compiling in a host computer system a purchaser profile for inclusion in a pool of purchaser profiles, by collecting in an electronic file in the host computer system identification and residence location information for at least one potential purchaser, collecting in the electronic file profile information provided by the at least one potential purchaser, effecting for the at least one potential purchaser one or more purchase transactions and collecting resulting transaction information in the electronic file, and preparing from at least the information from the acts above a profile for the at least one potential purchaser that is updated regularly.

Another embodiment of the invention is a method of aggregating a pool of potential purchasers to solicit an offer for a group purchase. In this embodiment, the method comprises assembling in a host computer information on a group of potential purchasers with known purchaser profiles, soliciting from at least one potential purchaser an indication of purchase interest for a good or service, and providing other potential purchasers with access to solicited information for the good or service so that the other potential purchasers can post an indication of purchase interest in the good or service, monitoring on a periodic basis a number of potential purchasers who have posted an indication of purchase interest for the good or service, responsive to the number of potential purchasers who have posted an indication of purchase interest for the good or service, communicating to at least one seller of the good or service a set of parameters of the group of potential purchasers who have posted an indication of purchase interest for the good or service, and soliciting an offer from the at least one seller of the good or service for a group purchase, and receiving from the seller and communicating to the plurality of potential purchasers who have posted an indication of purchase interest for the specified good or service an offer formulated on an assumption that it will be accepted by a substantial portion of the plurality of potential purchasers and reflecting resulting economies of scale.

Another embodiment of the invention is a method for providing at least one purchaser profile for inclusion in a pool of purchasers who may solicit an offer for a group purchase. This embodiment of the invention comprises sending at least one potential purchaser profile to a host computer for inclusion with a group of potential purchasers with known purchaser profiles, sending to a host computer an indication of purchase interest for a good or service for inclusion in a pool of potential purchasers so that other potential purchasers can post an indication of purchase interest in the good or service, receiving an offer from at least one seller of the good or service formulated on an assumption that it will be accepted by a substantial portion of the plurality of potential purchasers and reflecting resulting economies of scale, and communicating to the at least one seller the acceptance of its offer and initiating an exchange of payment to the seller and delivery by the seller.

Another embodiment of the invention is an apparatus for aggregating a pool of potential purchasers to solicit an offer for a group purchase. The apparatus comprises programs to assemble in a host computer information on a group of potential purchasers with known purchaser profiles, solicit from at least one potential purchaser an indication of purchase interest for a good or service, and provide other potential purchasers with access to solicited information for the good or service so that the other potential purchasers can post an indication of purchase interest in the good or service, monitor on a periodic basis a number of potential purchasers who have posted an indication of purchase interest for the good or service, responsive to the number of potential purchasers who have posted an indication of purchase interest for the good or service, communicate to at least one seller of the good or service a set of parameters of the group of potential purchasers who have posted an indication of purchase interest for the good or service, and solicit an offer from the at least one seller of the good or service for a group purchase, and receive from the seller and communicate to the plurality of potential purchasers who have posted an indication of purchase interest for the specified good or service an offer formulated on an assumption that it will be accepted by a substantial portion of the plurality of potential purchasers and reflecting resulting economies of scale.

Yet another embodiment of the invention is a computer-readable medium containing instructions for aggregating a pool of purchasers to solicit an offer for a group purchase, by assembling in a host computer information on a group of potential purchasers with known purchaser profiles, soliciting from at least one potential purchaser an indication of purchase interest for a good or service, and providing other potential purchasers with access to solicited information for the good or service so that the other potential purchasers can post an indication of purchase interest in the good or service, monitoring on a periodic basis a number of potential purchasers who have posted an indication of purchase interest for the good or service, responsive to the number of potential purchasers who have posted an indication of purchase interest for the good or service, communicating to at least one seller of the good or service a set of parameters of the group of potential purchasers who have posted an indication of purchase interest for the good or service, and soliciting an offer from the at least one seller of the good or service for a group purchase, and receiving from the seller and communicating to the plurality of potential purchasers who have posted an indication of purchase interest for the specified good or service an offer formulated on an assumption that it will be accepted by a substantial portion of the plurality of potential purchasers and reflecting resulting economies of scale.

The above embodiments of the invention provide numerous advantages. These embodiments provide for the profiling of information on potential purchases so that such information may be presented in a meaningful form to sellers of goods or services. These embodiments also allow potential purchasers to pool their purchasing power together in order to receive deals with advantageous terms from sellers of goods or services. These embodiments also provide sellers with an easy way to "link up" with potential purchasers who are interested in the sellers' goods or services. Finally, although there are other advantages to these embodiments which are not recited immediately above, one further advantage is that these embodiments save sellers of goods or services advertising costs.

Another embodiment of the invention is a method for delivery of targeted commercial messages. The method comprises assembling a plurality of potential purchaser profiles in an electronic file for presentation to at least one potential advertiser of goods or services applicable to a substantial portion of the plurality of potential purchasers, developing commercial message selection criteria for selecting from the potential purchasers those suited to receive a specified commercial message contained in a set of commercial messages, applying the commercial message selection criteria to the purchaser profiles to identify the potential purchasers suited to receive specified commercial messages, and presenting over a data network to a potential purchaser identified as suited, the specified commercial messages.

Another embodiment of the invention is a method for delivery of targeted commercial messages. This embodiment comprises assembling a plurality of potential purchaser profiles for presentation to at least one potential advertiser of goods or services applicable to a substantial portion of the plurality of potential purchasers, developing commercial message selection criteria for selecting from the potential purchasers those suited to receive a specified commercial message contained in a set of commercial messages, applying the commercial message selection criteria to the purchaser profiles to identify the potential purchasers suited to receive specified commercial messages, and presenting to a purchaser display unit of a potential purchaser identified as suited, the specified commercial messages.

Yet another embodiment of the invention is an apparatus for delivery of targeted commercial messages. The apparatus comprises programs to assemble a plurality of potential purchaser profiles in an electronic file for presentation to at least one potential advertiser of goods or services applicable to a substantial portion of the plurality potential purchasers, develop commercial message selection criteria for selecting from the potential purchasers those suited to receive a specified commercial message contained in a set of commercial messages, apply the commercial message selection criteria to the purchaser profiles to identify the potential purchasers suited to receive specified commercial messages, and present over a data network to a potential purchaser identified as suited, the specified commercial messages.

The above targeted commercial messages embodiments of the invention provide numerous advantages over traditional advertising. Using these embodiments of the invention, advertisers can selectively advertise to those potential purchasers who fit certain profiles that indicate that the potential purchasers may be interested in the specific good or service. Advertisers can thus save money and some or all of the savings may be passed on to the potential purchasers.

These and other objects and advantages of the present invention will become apparent with reference to the drawings, the description of the preferred embodiment, and the appended claims.

DESCRIPTION OF THE DRAWINGS

FIG. 4 is a flow chart illustrating the gathering of information from potential purchasers and the verification and updating of the potential purchaser's profile;

FIG. 5 is a representative Web site page that may be used to gather certain information from a potential purchaser;

FIG. 8 is a flow chart of a "make the deal" embodiment of the present invention;

DETAILED DESCRIPTION

The teachings of the present invention are applicable to many different types of computer networks and may also be used, for instance, in conjunction with direct on-line connections to databases. As will be appreciated by those of ordinary skill in the art, while the following discussion sets various preferred implementations of the methods and systems of the present invention, these implementations are not intended to be restrictive of the appended claims, nor are they intended to imply that the claimed invention has limited applicability to one type of computer network. In this regard, the teachings of the present invention are equally applicable for use in Local Area Networks ("LANs") of all types, Wide Area Networks ("WANs"), private networks, and public networks including the Internet and the Web. While the principles underlying the Internet and the Web are described in some detail below in connection with various aspects of the present invention, this discussion is provided for descriptive purposes only and is not intended to imply any limiting aspects to the broadly claimed methods and systems of the present invention.

The accompanying Figures depict embodiments of the systems and methods of the present invention, and features and components thereof. With regard to references in this specification to computers, the computers may be any standard computer including standard attachments and components thereof (e.g., a disk drive, hard drive, CD player or network server that communicates with a CPU and main memory, a sound board, a keyboard and mouse, and a monitor). The processor of the CPU in the computer may be any conventional general purpose single- or multi-chip microprocessor such as a Pentium® processor, a Pentium® Pro processor, a 8051 processor, a MIPS® processor, a Power PC® processor, or an ALPHA® processor. In addition, the processor may be any conventional special purpose processor such as a digital signal processor or a graphics processor. The microprocessor may have conventional address lines, conventional data lines, and one or more conventional control lines. With regard to references to software, the software may be standard software used by those skilled in the art or may be coded in any standard programming language to accomplish the tasks detailed below.

A. General Overview of System Hardware

Figure 1:
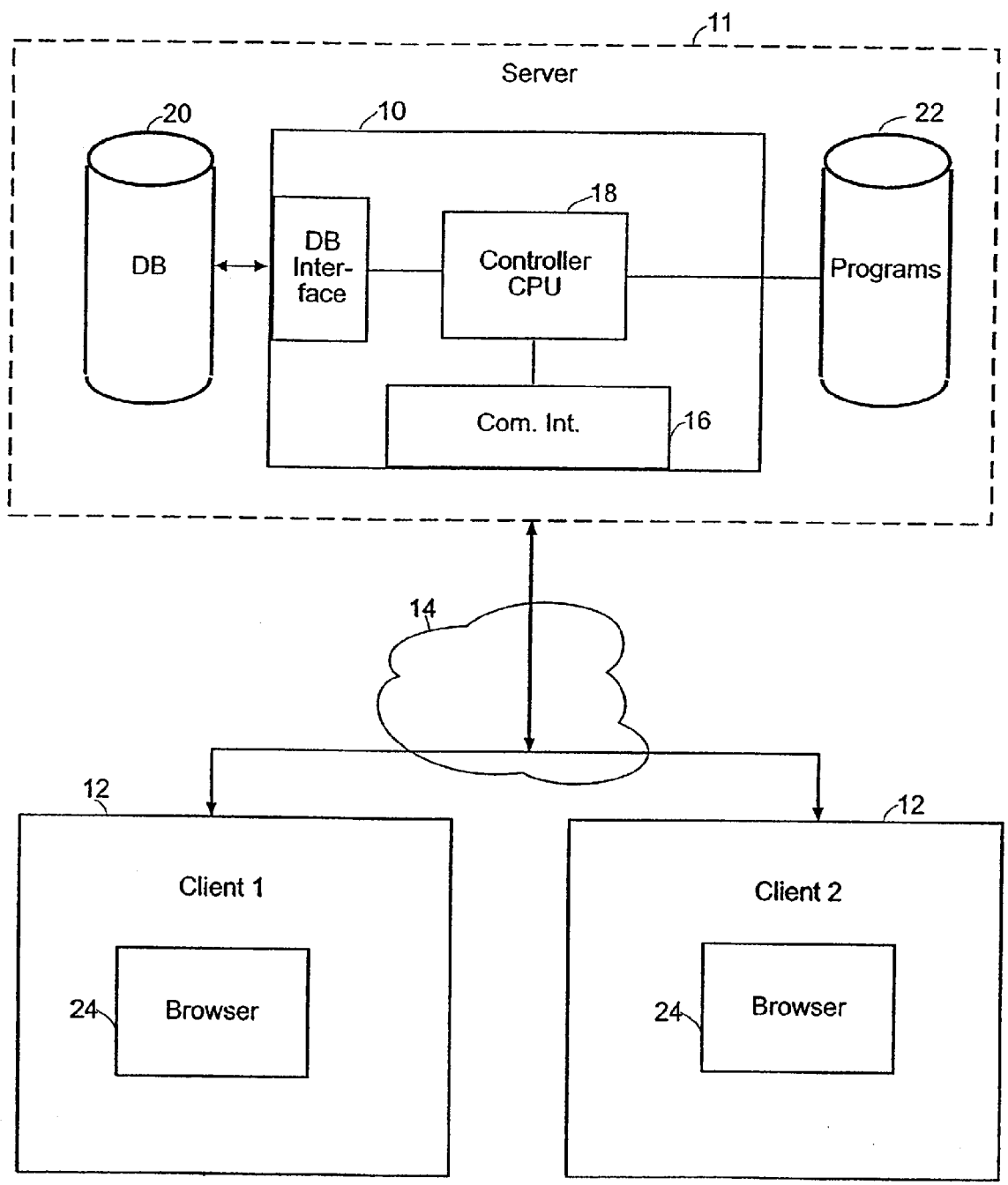
FIG. 1 is a block diagram overview a client-server system in which the present invention functions.

FIG. 1 is a block diagram illustration of the environment of one embodiment of the present invention, which is a computer network based on a client-server model. The network comprises one or more servers 10 which are accessible by one or more clients 12, such as personal computers. For simplicity, FIG. 1 shows only one server 10 and two clients 12. The server 10 operates an electronic file 11 to carry out the functions of the invention. The term "electronic file" will be used throughout this specification in a general sense to refer to any and all database or program files that may exist on the one or more servers 10. FIG. 1 shows this electronic file 11 in phantom because it may encompass all of the files on the server 10 or only a portion thereof. In one embodiment, the electronic file 11 may be a Web site. The server 10 depicted in FIG. 1 may comprise more than one server networked together, or a single server 10 as depicted. The servers 10 communicate with the clients 12 over a communication path 14, which may be a Local Area Network (LAN), Wide Area Network (WAN), direct dial connection, the Internet, or other suitable telecommunications path. In one embodiment, for instance, the clients 12 may be computers, while in another embodiment, the clients 12 may be people who interact with the server 10 over a communication path 14.

The communication path 14 as depicted in FIG. 1 may be the Internet. The Internet is a collection of computer networks that allows computer users to share files and other computer resources. Each computer connected to the Internet has a unique address whose format is defined by the Internet Protocol ("TCP/IP"). The system as depicted in FIG. 1 may therefore operate over the "World Wide Web" ("Web"), which is that collection of servers on the Internet that utilize the Hypertext Transfer Protocol ("HTTP"). HTTP is a known application protocol that provides users access to resources, which may be information in different formats such as text, graphics, images, sound, video, Hypertext Markup Language ("HTML"), as well as programs. HTML is a standard page description language which provides basic document formatting and allows the developer to specify "links" to other servers and files. Links may be specified via a Uniform Resource Locator ("URL"). Upon specification of a link by the user, the client makes a TCP/IP request to a Web server and receives information, which may be another "Web page" that is formatted according to HTML, from a server that was specified in the requested URL. The information returned to the client may be generated in whole or in part by a program that executes on the server 10. Such programs are typically Common-Gateway-Interface scripts ("CGI scripts") and can be written using known programming languages or methods that the server supports, such as PERL or C++. Such programs may also be custom application logic that is loaded into the Web server software itself, in which case the Web server software will contain embedded custom logic that enables the Web server to generate content. A suitable network protocol, such as the TCP/IP protocol, may therefore be used for the communications over communication path 14.

The server 10 may comprise Web servers and application servers, and may be any computer known to those skilled in the art. As shown in FIG. 1, the server 10 may contain a communications interface 16, through which communications over the communication path 14 occur, a CPU 18, a database 20, and a set of programs 22, as well as other standard components known to those skilled in the art. The database 20 may be used to store the information identified below which may be used in the present invention, and the database 20 may reside in one or more servers 10. Similarly, the set of programs 22 may be used to perform the functions of the present invention as described below, and the set of programs 22 may reside in one or more servers 10. The set of programs 22 may process requests and responses from the clients 12, send the proper information to the clients 12, and perform processes on the server 10. If the Internet is used within an embodiment of the invention, these programs 22 may be CGI scripts.

As noted above, the clients 12 may be any standard computer known to those skilled in the art, and may be connected to communication path 14. The client 12 may comprise a processor or CPU and main memory, an input/output interface for communicating with various databases, files, programs, and networks, and one or more storage devices, such as disk drive devices or CD ROM devices. The client 12 may also have a monitor or other screen device, a printer or other output device, and in input device such as a keyboard. As is well known in the art, the computer 12 executes programs stored on a data storage medium, which may be either a memory system of the client 12 or a persistent storage device, such as a disk or CD ROM system, so as to carry out the functions of the present invention. The clients 12 shown in FIG. 1 may contain browsers 24, which allow the user of the client 12 to communicate with one or more servers 10 and view information received over the Web. The scope of the invention, however, is not limited to Web applications and computers as the clients 12. In one embodiment, for instance, the term "client" may be used to refer to a computer operated by an individual person who sends and receives information over the communication path 14 to communicate with the server 10.

The following discussion details the functions and acts of the programs 22 and electronic file 11 on the server 10 or the functions of software on the clients 12 to perform the current invention. A "system proprietor" may control the operation of the electronic file 11 on the server 10 to control the flow of information between potential purchasers (using clients 12) and sellers of goods or services. Information may be gathered through standard user interface software known to those skilled in the art, including programs typically used for the creation of user interfaces for soliciting and receiving information for Web applications. Such programs may include standard error messages or user prompts which aid in the solicitation or presentation of information. The present invention, however, may be used in embodiments other than those that involve the Web as a communication path 14.

B. Operation of the Invention

Figure 2:
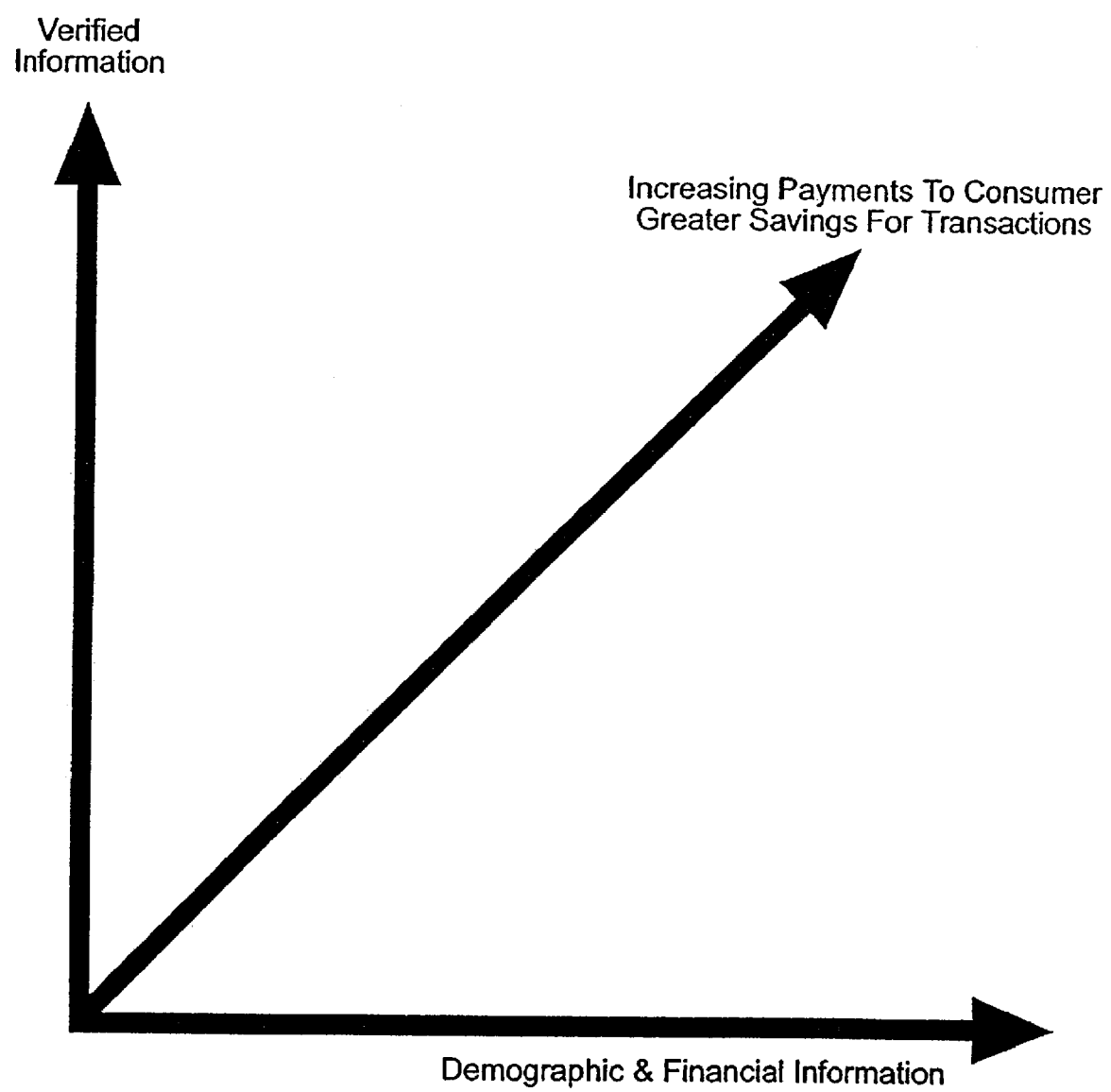
FIG. 2 is a graph illustrating the value of information to an advertiser or potential purchaser.

The operation of the systems and methods of the present invention are illustrated in FIGS. 3-11. As an introduction, FIG. 2 illustrates the value of certain types of personal profile information to the present invention. FIG. 2 is a chart that shows that as the amount of demographic, financial, and other information about a potential purchaser increases, the value of that information to a seller also increases. The y-axis indicates that as the quality or verifiability of the information increases, so does the value to a seller. If profiles of information about potential purchasers can be aggregated, the value of this information also increases because a seller can offer a certain deal to the group of potential purchasers based on the assumption that a generally predictable number of them will buy the offered good or service. The prediction will be more or less reliable, based on the available information about the potential purchasers and whether such information has been verified or updated so that the information may be considered reliable.

1. General Overview

Figure 3:
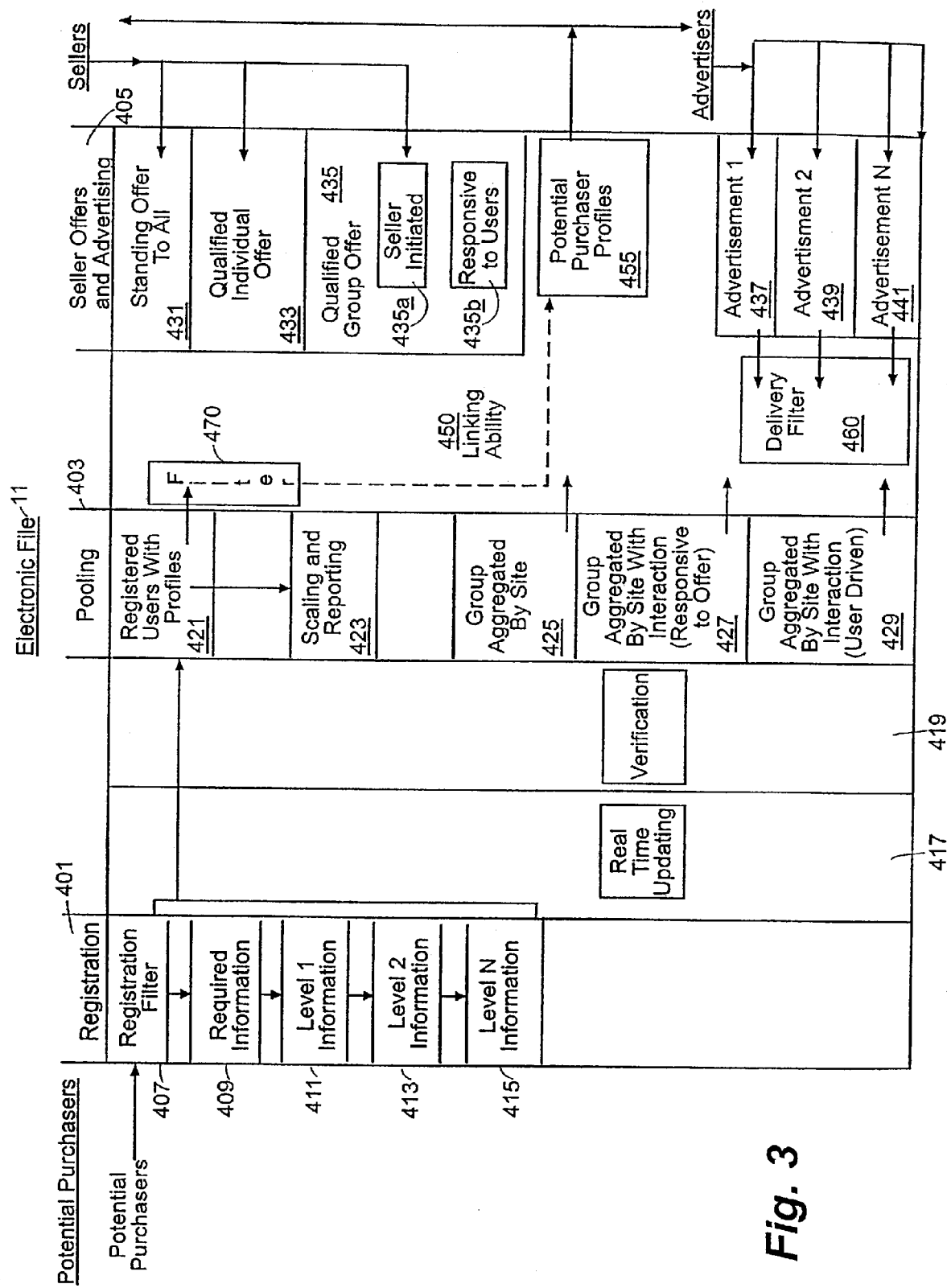
FIG. 3 is a block diagram that shows a number of features of the present invention.

FIG. 3 shows the general operation of the invention, which will be briefly described with reference to FIG. 3 and then more fully described below with reference to FIGS. 4-11. FIG. 3 illustrates an electronic file 11, which may reside in the server 10, controlling the flow of information between potential purchasers and sellers of goods or services. As stated above, a system proprietor may operate the electronic file 11, which, in one embodiment, may take the form of a Web site. Potential purchasers and sellers of goods or services may then interact with the electronic file 11 to form deals or exchange information. The system proprietor may ultimately control the flow of information between potential purchasers and sellers, and the system proprietor may have contractual arrangements with the potential purchasers and/or sellers for purposes of maintaining the privacy of information.

FIG. 3 shows three broad areas within the electronic file 11: a registration area 401, a pooling area 403, and a seller offers and advertising area 405. Certain acts or bundles of information are depicted in FIG. 3 below each of these three areas, and there are spaces between the three areas where other acts may occur. In general, potential purchasers provide information about themselves to register with the system proprietor and sign up for deals, sellers of goods or services post offers on the electronic file 11, and advertisers post advertisements on the electronic file 11.

Throughout this specification, a certain distinction will be made between sellers and advertisers. The term "seller" will be used to refer to a party that posts definite terms for an offer to sell goods and services on the electronic file 11. The term "advertiser," on the other hand, will be used to refer to a party that advertises in the general sense, such that any offer conveyed through an advertisement cannot be immediately accepted through the electronic file 11 or signed up for through the electronic file 11. An advertisement, therefore, will be used to refer to a more traditional broadcast advertisement, such as one using television, radio, or even email. An offer for sale by a seller will be used to refer to an offer posted on the electronic file 11 which a potential purchaser may sign up for (which may be subject to threshold conditions set by the seller) through the electronic file 11 operated by the system proprietor.

Throughout this specification, a "potential purchaser" refers to any person who wishes to sign up for a deal or register with the party operating the electronic file 11 or Web site. A potential purchaser may be either a guest of the electronic file 11, a user, or a registered user. A "registered used" is a potential purchaser who has completed the registration process, which involves providing certain information about themselves, to enroll with the system proprietor. A "user" is a person who only creates a user name and password, but provides no useful information about themselves, such as demographic information, to register as a registered user. A "guest" is a potential purchaser who has not completed the registration process, but who is still allowed certain browsing privileges on the electronic file 11. A guest may be required to provide certain information about themselves (and hence become a registered user) in order to sign up for a deal offered by a seller of goods or services.

The left side of FIG. 3 depicts potential purchasers providing information to the electronic file 11 to register with the system proprietor. Potential purchasers may provide information about themselves through a registration filter 407 in the electronic file 11. Because users and guests may, in one embodiment, sign up for deals, the registration filter 407 may allow users and guests to sign up for deals without already being registered users. In another embodiment, a potential purchaser must either be a registered user to sign up for a deal or, if the potential purchaser is a user or a guest, provide registration information to become a registered user in order to sign up for a deal. In this embodiment, the electronic file 11 has a mechanism for verifying a potential purchaser's identify if he or she returns to the electronic file 11 for future purchasers. In the registration process, a potential purchaser may have to provide certain required information 409 in order to register with the system proprietor or sign up for a deal. Aside from this required information 409, different levels of information 411, 413, 415 may be provided by the potential purchaser if desired. The information sought by each level differs in invasiveness, and certain offers by sellers require information of a certain level of invasiveness. A profile containing the information gathered from each potential purchaser is formed in the electronic file 11 after a potential purchaser provides such information.

After a potential purchaser provides the information in column 401 to register with the system, the information may be updated in real time (numeral 417 in FIG. 3), and the information by may verified (numeral 419 in FIG. 3) by contacting outside sources of information. These processes will be described in more detail below.

Column 403 (pooling) in FIG. 3 depicts the organization and forms that profiles of potential purchasers may take. Block 421 depicts the profiles of all potential purchasers that are registered users with the system proprietor, which may also include profiles for those potential purchasers who have signed up for deals but have remained guests of the system proprietor. Block 423 depicts the scaling and reporting features that may be offered by the system proprietor. The scaling and reporting features 423 allow individual registered users to view their individual information and to determine how they relate to other registered users. The scaling and reporting features 423 may also allow individual registered users to determine how their individual information, such as their financial status, compares to a recommendation from an expert as to approximately how that information should appear for a person in the demographic category of the particular registered user.

Blocks 425, 427, and 429 illustrate different groups of profiles of potential purchasers that may be formed by the system proprietor or by potential purchasers interacting with the electronic file 11. Each of these groups will be discussed in greater detail below. Group 425 is a group that the system proprietor organizes without interaction from potential purchasers. Group 427 is a group aggregated by the Web site with interaction from potential purchasers and in response to an offer from a seller. Group 429 is a group aggregated by the Web site with interaction from potential purchasers, but not in response to an offer from a seller.

Column 405 illustrates the interaction between the sellers of goods and the electronic file 11, as well as the interaction between advertisers and the electronic file 11. Sellers of goods can make certain offers to potential purchasers through the electronic file 11. Three types of offers are depicted in FIG. 3: standing offers 431, qualified individual offers 433, and qualified group offers 435. Each type of offer may be either entered in the electronic file 11 by the system proprietor (after contact with a seller) or by an individual seller posting an offer directly to the electronic file 11. A qualified group offer 435, which may take different forms (two of which are listed as numerals 435a and 435b), is generally an offer that may be accepted only if a threshold number of potential purchasers sign up to accept the offer. The following sections of this specification will more fully describe a qualified group offer 435.

A standing offer 431 is an offer that is posted in the electronic file 11 which may be accepted by any individual potential purchaser. The seller of a good or service for a standing offer 431, therefore, sets no particular terms for the offer. A qualified individual offer 433 is an offer which may be accepted by an individual potential purchaser, but only if that individual potential purchaser fulfills certain profile requirements of the seller. For instance, in order to accept a qualified individual offer 433, it may be necessary for a potential purchaser to have a certain minimum income. FIGS. 7 and 8 also indicate (at blocks 204 and 304 respectively) a current deal embodiment, which refers to either a standing offer (numeral 431 in FIG. 3) or a qualified individual offer (numeral 433 in FIG. 3). A current deal may be a deal posted in the electronic file 11 for which a single potential purchaser may sign up, with the deal not being dependent on other potential purchasers signing up for the deal. If the terms of the deal are acceptable to the potential purchaser, the potential purchaser may sign up for the deal and certain segments of the profile for that potential purchaser may be provided to the seller of the good or service to close the deal, subject to any profiles requirements set by the seller of the goods or services (such as for a qualified individual offer 433).

FIG. 3 also depicts a number of advertisements 437, 439, 441 that may be posted to the electronic file 11 by advertisers. Advertisement N (numeral 441) represents the possibility that any number of advertisements may be posted in the electronic file 11. Through the targeted commercial messages feature of the invention, which will be described in more detail below, these advertisements 437, 439, 441 may be presented to only certain potential purchasers who meet requirements set by the advertiser. In one embodiment of the targeted commercial messages embodiment of the invention, profile information will be provided to advertisers only at the request of a registered user.

The area between column 403 and column 405 in FIG. 3 represents the linking ability 450 of the present invention. Linking ability 450 refers to the process by which profile information of potential purchasers is linked with or provided to sellers or advertisers. In other words, profile information of registered users is not automatically provided to sellers or advertisers, but instead is only provided to sellers or advertisers if certain conditions are met. Although information concerning offers (numerals 431, 433, and 435) is generally available to potential purchasers through the electronic file 11, it is possible that an offer may only be accepted by certain qualified individual potential purchasers or by a group of potential purchasers. Linking ability 450, therefore, refers to the ability of the electronic file 11 to provide certain potential purchaser profile information to sellers or advertisers (FIG. 3 depicts such information in transfer as block 455), and to the ability of the electronic file 11 to provide offer information to the potential purchasers.

FIG. 3 also depicts a delivery filter 460 adjacent the advertisements 437, 439, 441. This delivery filter 460 provides for a feature of the invention in one embodiment that allows the advertisements 437, 439, 441 to be presented to certain targeted potential purchasers. Filter 470 is associated with the profiles of potential purchasers and is present in FIG. 3 to represent the possibility that certain information of potential purchasers may be provided to sellers or advertisers. A certain amount of information in the profiles may be stripped by the filter 470 prior to transmission to the sellers or advertisers, however, so that the sellers or advertisers cannot determine the identity of the potential purchasers.

The following sections detail the functions and features of the invention presented above in reference to FIG. 3 in greater detail.

2. Gathering Information from Potential Purchasers

In order to present information on potential purchasers to sellers, the information may be gathered in the electronic file 11 through any variety of methods known to those skilled in the art. The information gathered from the potential purchasers will, in one embodiment, remain confidential with the system proprietor unless and until a potential purchaser desires that the information be provided to sellers or advertisers of goods or services. In this embodiment, a potential purchaser may register with the system proprietor while still maintaining the confidentiality of private information without worrying about disclosing private information to sellers. FIG. 4 illustrates one procedure for gathering information from a potential purchaser. Although FIG. 4 is written with reference to one individual potential purchaser, the procedure may be followed to gather information from any variety of potential purchasers, and the information may be gathered through server-client interaction as discussed above. In particular, the information may be collected using the Web, and the following discussion assumes that the Web will be the method used to gather the information, although, as noted above, other methods and systems may also be used.

In an embodiment where the server 10 operates a Web site (referred to as an electronic file 11 in the remainder of this section) for the operation of the invention, the potential purchaser may be prompted one or more times while using the electronic file 11 to enter information about himself or herself. At block 101 of FIG. 4, required information for enrollment in the system of the invention may be solicited and received from a potential purchaser (this required information is depicted in block 409 of FIG. 3). At block 103 of FIG. 4, the potential purchaser may be prompted to create a password. FIG. 5 depicts one embodiment of a Web page that may be sent from the server 10 to a client 12 so that a potential purchaser can enter and transmit required information and a password to register with the system proprietor. As depicted in FIG. 5, required information to enroll with the system proprietor may include a user's (or potential purchaser's) name 50, which may consist of the user's first name 51, middle name 52, and last name 53, the user's address 58 and phone number 60, and a password 54 for security. As depicted in FIG. 5, the potential purchaser may also be prompted to confirm the password 54, enter information to assist the potential purchaser in remembering the password 54, and enter information on how the potential purchaser heard about the system of the present invention. An account or profile may be established for each potential purchaser with a unique number and access code (or password) so that the information may be secure. As noted above, a potential purchaser who completes the registration process is known as a registered user.

After any required information is entered by the potential purchaser as depicted in blocks 101 and 103 of FIG. 4, information falling into different levels of usefulness may be solicited and received from the potential purchaser. FIG. 4, in blocks 105, 107, and 109, depicts the solicitation and transmission of information falling into three levels of usefulness. These levels of usefulness also correspond roughly to the perceived invasiveness of the information requests to the potential purchaser, with the information of high usefulness being the most invasive to the potential purchaser. After the required information is solicited and received, in one embodiment the potential purchaser can enter as much or as little of the information depicted in blocks 105, 107, and 109 as desired, although FIG. 4 depicts an embodiment where level 1 information (low value information) must be entered to enroll in the system of the present invention. As depicted in FIG. 4, after the potential purchaser enters different levels of information, the potential purchaser may be done with the registration process. As FIG. 4 also depicts, the potential purchaser can enter only level 1 information (or, in one embodiment, only the required information of blocks 101 and 103) to complete the registration procedure.

Figure 6A:
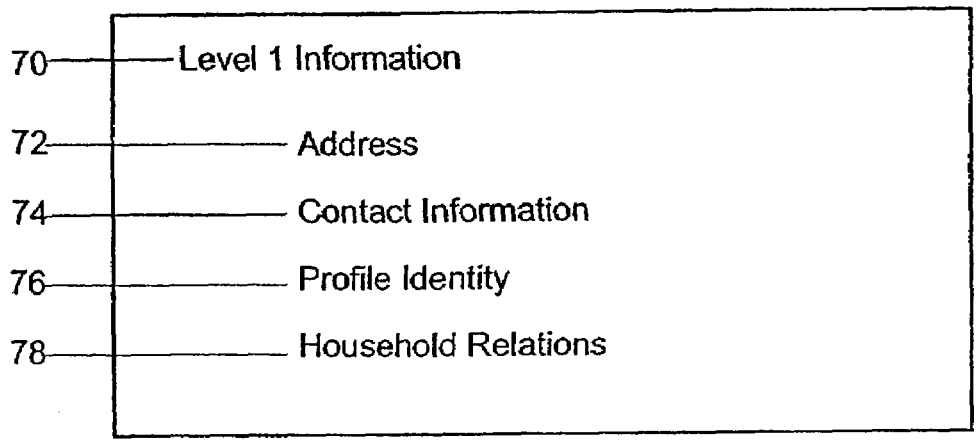
FIG. 6a is a depiction of a low value information record.
Figure 6B:
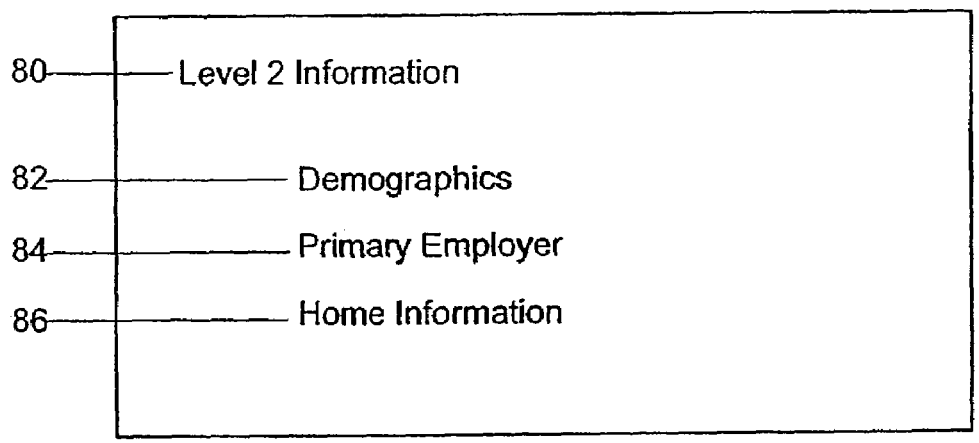
FIG. 6b is a depiction of a medium value information record.
Figure 6C:
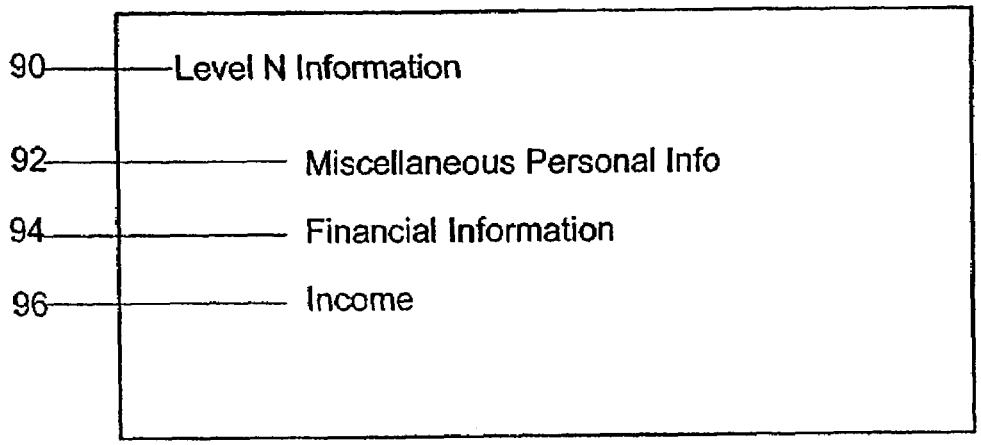
FIG. 6c is a depiction of a high value information record.

FIGS. 6a, 6b, and 6c depict the types of information that may fall into the different levels of usefulness (or invasiveness). Some of the information depicted in FIGS. 6a, 6b, and 6c may also overlap with some of the required information of block 101 of FIG. 4, although these information fields could be automatically filled in to speed the registration process, or the potential purchaser could simply not be prompted to enter this information a second time. FIG. 6a shows level 1 information 70, which can include the potential purchaser's address 72, contact information 74, profile identity 76, and household relations 78. The potential purchaser's address 72 may include one or more addresses, including street addresses, cities, states, area codes, and so forth. The contact information 74 may include the potential purchaser's home phone number, daytime phone number, evening phone number, cellular phone number, fax number, an email address, and the best time to attempt to contact the potential purchaser. The profile identity 76 may include the potential purchaser's first name, middle name, last name, and relationship to the individual who is the head of the household. Finally, the household relations 78 information may include the total number of people in the household, the head of the household, and information on the number of children, parents, or other relations or dependents of the head of the household, as well as the names of such people.

Level 2 information 80, as depicted in FIG. 6b, may include demographic information 82, information on the potential purchaser's employer 84, and home information 86. The demographics information 82 may include the potential purchaser's sex, marital status, and date of birth, as well as other demographics information. The employer information 84 may include the potential purchaser's employment status, date of hire, position, employer, and employer address. The home information 86 may include the amount of time the potential purchaser has resided at the current address, whether the potential purchaser owns the home or rents, and the potential purchaser's total monthly rent or mortgage payment.

Level N information 90 refers to information in a final level of invasiveness, and any number of levels of information may exist between the level 2 information 80 and the level N information 90. Level N information 90, as depicted in FIG. 6c, may include miscellaneous personal information 92 about the potential purchaser, financial information 94, and income information 96. The miscellaneous personal information 92 may include such information as the potential purchaser's social security number and driver's license number, as well as other personal information. The financial information 94 may include the potential purchaser's checking account number, savings account number, and information about the potential purchaser's bank or banks. The income information 96 may include the potential purchaser's annual personal gross income, additional personal income, and sources of additional personal income. Numerous other types of information may also be gathered from the potential purchaser within the scope of the present invention, including the carrier of the potential purchaser's mortgage, the size of the mortgage and monthly mortgage payments due, medical information about the potential purchaser, and the amount of credit card debt carried by the potential purchaser.

3. Verification and Profiling of Information

After information has been gathered from a registered user as described above, the information may be verified for accuracy, updated, and profiled in comparison to other registered users. FIG. 4 depicts these acts taking place either at the end of the registration process or as a separate procedure that can occur at any given time. As indicated above, the value of information to sellers increases if it is verified and/or updated information.

Block 111 of FIG. 4 depicts the verification of a potential purchaser's information (also represented as numeral 419 in FIG. 3). The information may be verified by comparing it to information in a variety of other databases, such as public databases maintained by cities, counties, or states, or other governmental entities, or private databases which may be accessed, perhaps for a certain price. Third party verification sources include credit bureaus, state departments of motor vehicle records or databases, and property tax databases or records. Information may be verified manually or, more preferably, by use of a computer program that compares information and identifies discrepancies. Self-verification is another method to verify a potential purchaser's information. For instance, if credit card or other information indicates that a potential purchaser consistently purchases diapers, it may be assumed that the potential purchaser has at least one young child. After information has been verified, the potential purchaser's profile may be updated to reflect information from which verification with secondary sources was successful and information from which verification from secondary sources was not successful.

The information in a potential purchaser's profile may also be updated from time to time to ensure that current information is in the system, as depicted in block 115 of FIG. 4 (also represented as numeral 417 in FIG. 3). Profiles may be updated by any variety of methods, including sending emails to a registered user asking for updated information, telephoning registered users to update the registered user's profile, or requiring a registered user to enter updated information upon logging on to the system. The registered user's profile may also be updated by receiving transaction information from transactions effected by the registered user through entities other than the system proprietor of the present invention. In one embodiment, for instance, a registered user may provide access to credit card databases that would allow the registered user's profile to be updated. The act of updating may also involve gathering additional information about the potential purchaser from outside information sources after getting permission from the potential purchaser to do so. Information could be gathered from various online sources, credit bureaus, government databases, credit card companies, and any other information providers.

Block 117 of FIG. 4 depicts the gathering of possible future purchasing information from a potential purchaser. If this information is gathered and a number of potential purchasers have similar purchase interests, this information may be presented to advertisers or sellers of goods or services so that sellers or advertisers can offer new deals on those specific goods or services.

A registered user may desire to access his or her information profile on the electronic file 11 and determine how he or she compares to other registered users. Each registered user's profile, therefore, may be scalable in relation to the profiles of other registered users, as depicted in block 113 of FIG. 4. The term "scalable" will be used to refer to any method of depicting how one registered user's profile (or any of the information therein) compares with other registered users' profiles. For instance, a registered user may wish to determine how his or her income or amount of savings compares to the other registered users. A graphical depiction of the registered user's income or amount of savings could therefore be displayed in relation to the average of the other registered users in the electronic file 11.

4. Group Aggregated by the Site

After a number of registered users exist on the electronic file 11, the system proprietor may wish to aggregate profiles of these registered users into different groups. FIG. 3 depicts these groups as groups aggregated by the site (numeral 425). For example, registered users may be grouped according to income. The system proprietor could then offer certain parameters of an income level group to a seller of goods or services in order to solicit an offer. The set of parameters provided to the seller from the system proprietor may, in one embodiment, be of a general nature so that private information about individual registered users is not provided to the seller. A seller of goods or services may then use the set of parameters of the group of registered users to formulate an offer for the sale of a specific good or service.

Figure 7A:
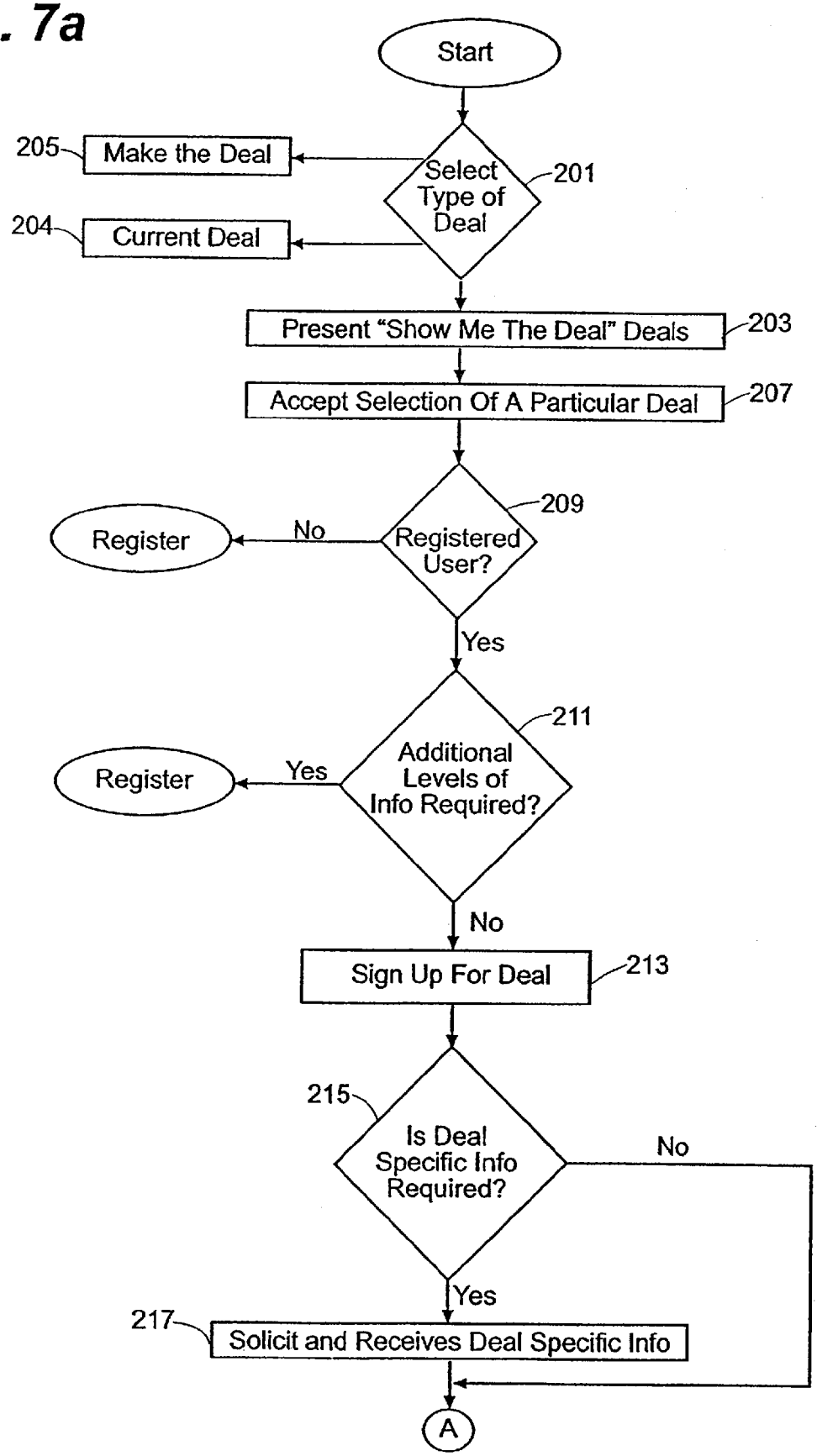
FIG. 7a is a first flow chart of a "show me the deal" embodiment of the present invention.
Figure 7B:
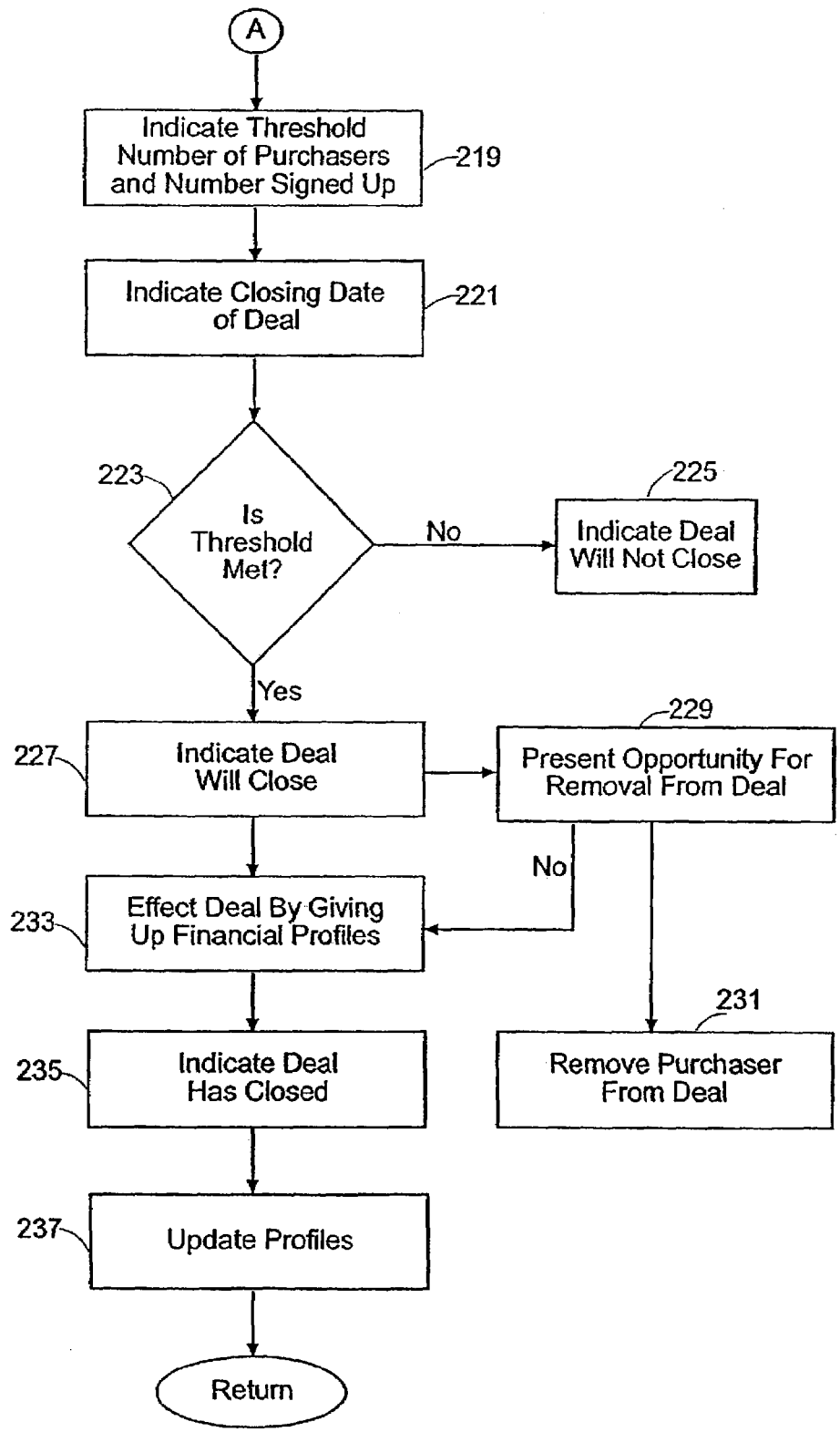
FIG. 7b is a second flow chart of a "show me the deal" embodiment of the present invention.

5. Group Aggregated by the Site with Interaction from Users Responsive to an Offer from a Seller a. Signing Up for a Deal Potential purchasers, including, in one embodiment, guests, may also be grouped in the electronic file 11 in response to a specific offer from a seller of goods or services. FIG. 3 refers to such a group as a group aggregated by the site with interaction (responsive to an offer) and refers to such a group with numeral 427. FIGS. 7*a* and 7*b* depict a flow chart of this grouping embodiment of the present invention that may be referred to as the "show me the deal" embodiment. In this embodiment, a seller of goods or services presents a deal to one or more potential purchasers, and, in one embodiment, the deal will only be consummated if a certain number (a threshold number) of potential purchasers sign up for the deal. Because sellers of goods or services can offer discounts through economies of scale if they receive a large amount of information on a group of potential purchasers (some of which may be very useful, highly invasive personal information), potential purchasers may be pooled together to form one bargaining unit that can receive a better deal than any one potential purchaser negotiating individually with a seller. The seller saves money on advertising expenses because those potential purchasers who sign up for a deal are likely to purchase the specific good or service, and therefore the seller can advertise very effectively to an interested group of potential purchasers without mass advertising to unlikely potential purchasers. Offers may be solicited from sellers by the system proprietors or sellers may have access to the electronic file 11 of the present invention so that the sellers can themselves post an offer for a deal in the electronic file 11. If the system proprietor operates a Web site, for instance, a seller could post an offer for a deal on the Web site.

Upon entering the Web site that operates the electronic file 11, the potential purchaser may be presented with an option to choose the type of deal for which he/she is interested, as depicted in Block 201 of FIG. 7*a*. Block 203 depicts the presentment of a number of deals of the "show me the deal" embodiment, while blocks 204 and 205 depict two other forms of deals which will be discussed below. A "show me the deal" deal is one in which a seller of goods or services agrees to offer certain terms, such as price, for a good or service if a certain number of potential purchasers (a threshold number) sign up for the deal by a certain date. At block 203, therefore, a number of standing deal offers may be presented to the potential purchasers. FIG. 3 refers generally to these offers as qualified group offers 435, and more particularly as seller initiated qualified group offers 435*a* because the sellers post such offers on the electronic file on their own volition. The seller initiated qualified group offers 435*a* may be grouped into the type of deal, such as mortgage services, banking services, telephone services, or sporting goods. After the potential purchaser selects a specific deal, views its terms, and decides to sign up for the deal, as depicted in block 207, the potential purchaser may be prompted to determine if the potential purchaser is registered user or a guest to the electronic file 11.

At block 209 of FIG. 7*a*, the electronic file 11 determines if the potential purchaser is a registered user or a guest. This procedure could involve simply asking the potential purchaser or, alternatively, asking for certain information about the potential purchaser and then searching to determine if a registered user having that specific information is registered in the electronic file 11. If the potential purchaser is not registered, the guest may be prompted to register with the system proprietor, as depicted in FIG. 4. If the potential purchaser is a registered user, the electronic file 11 may determine whether additional levels of information (i.e., level 1, level 2, level N) is required for the specific deal. Some deals, for instance, may require a potential purchaser to enter level 2 information in order to sign up for the deal. Other deals may require little or no information beyond the required information. If level 1, level 2, or level N information is required of a potential purchaser for a specific deal, as depicted in block 211, the potential purchaser may be required to enter that information to sign up for the deal. If such information is not required, the potential purchaser may be signed up for the deal, as depicted at block 213.

In one embodiment, certain deals may require specific information which may not be included within the required information or level 1, level 2, or level N information. As depicted in blocks 215 and 217, such specific information may be solicited and received from the potential purchaser. Some deals, for instance, may require the potential purchaser to enter medical information, level of education, current mortgage rate, or other potentially invasive information. If the deal concerns phone services, for example, the potential purchaser may be required to enter information such as his or her current local phone company, long distance phone company, long distance calling minutes per month, foreign calling minutes per month, and average monthly phone bill. In one embodiment, if the potential purchaser does not wish to enter such information and refuses to do so, he or she cannot sign up for the deal. In these embodiments, the value of the specific information to the advertiser or seller of the goods or services may be so great that the seller is not willing to offer such a deal if the specific information is not provided by the potential purchaser.

In some situations, a potential purchaser may not fit the requirements preferred by the seller of the goods or services to qualify as a purchaser. In one embodiment, the potential purchaser may not be allowed to sign up for a given deal if the requirements are not met. If a certain deal is for a mortgage, for instance, only potential purchasers with certain incomes or savings may qualify as purchasers for the mortgage.

b. Closing a Deal

After a potential purchaser has signed up for a specific deal, the potential purchaser may be informed of the number of potential purchasers signed up for that particular deal and how many more are needed in order for the seller of the goods or services to consummate the deal. This information may be provided to the potential purchasers at any time before or after a potential purchaser signs up for a deal, and it may be presented to the potential purchasers through a Web site, by email, or by other methods known by those skilled in the art.

Block 219 of FIG. 7*b* depicts an indication to one or more potential purchasers of the threshold number of potential purchasers required for the deal to close and the number of potential purchasers signed up for the deal. The date that the offering for the deal is scheduled to close may also be indicated to the potential purchaser, as depicted in block 221. When the date that the offering for the deal is scheduled to close, a determination may be made as to whether the threshold number of potential purchasers have signed up for the deal, as depicted in block 223. If the threshold has not been met, potential purchasers and the seller of the goods or services may be notified that the deal has not closed, in one embodiment by email, as shown in block 225. If the threshold may be met or is very close to being met, such a message may be sent to the potential purchasers. Similarly, if the threshold will be met, a corresponding message may be sent to the potential purchasers. In another embodiment, the seller of the goods or services may be given the option of accepting a lower number of potential purchasers who have signed up for a deal (i.e., below the threshold number) or extending the date through which the deal will be offered. If such is the case, the potential purchasers may be notified by email or otherwise that the deal will close in a certain number of days even though the threshold number of potential purchasers has not been met, or that the date through which the deal will remain open has been extended.

If the threshold level of potential purchasers is met, the potential purchasers signed up for the deal may be notified that the deal will close in a certain number of days or weeks, as depicted in block 227. In one embodiment, the potential purchasers signed up for the deal will be presented with the opportunity to remove themselves from the deal before their information is provided to the seller of the goods or services. Block 229 depicts this possibility. If the potential purchaser removes himself or herself from the deal (block 231), a confirmation message may be sent to the potential purchaser and the number of potential purchasers signed up for the deal may be updated accordingly.

Block 233 depicts the electronic file 11 effecting the closure of deal by providing the profiles of the potential purchasers to the seller of the goods or services for the particular deal (also depicted as block 455 in FIG. 3). Because the confidentiality of the information in the profiles of the potential purchasers may be important, in one embodiment sellers may be contractually bound to use the information only for the particular deal and to destroy it afterward so that it will not be used for other purposes. Block 233 may, in one embodiment, be the first time that any information regarding profiles of potential purchasers will be presented to the sellers of the goods or services. After such information has been provided to the seller of the goods or services, it may, in one embodiment, be up to the individual seller to market the deal to the potential purchaser so that a real deal (involving the transfer of goods or services in exchange for money) is consummated. Although references may be made to a deal closing, therefore, these references may refer to only the exchange of information from the electronic file 11 to the sellers of goods or services. In another embodiment, however, the acceptances of the seller's offer may be communicated to the seller and an exchange of payment from the potential purchaser to the seller and delivery by the seller may be initiated through the system.

Upon the closure of a deal, the status of the deal may be indicated to the potential purchasers signed up for the deal (block 235), and the profiles of those potential purchasers who signed up for the deal may be updated to reflect the new information (block 237).

6. Group Aggregated by the Site with User Driven Interaction a. Signing Up for a Deal Potential purchasers may also group themselves in the electronic file 11 in order to solicit a specific offer from a seller of goods or services. FIG. 3 refers to such a group as a group aggregated by the site with interaction (user driven) and refers to such a group with numeral 429. FIG. 8 depicts a flow chart of this grouping embodiment of the present invention that may be referred to as the "make the deal" embodiment. In this embodiment, a potential purchaser can post an indication of interest in the purchase of a specific good or service. This indication of interest may then be indicated through the electronic file 11 to other potential purchasers, who may likewise post an indication of interest in the purchase of the specific good or service. If a large enough number of potential purchasers post an indication of interest in a specific good or service, the parameters of the interest in the good or service may be presented to one or more sellers of the good or service, who may then post a corresponding offer for the good or service with similar parameters as requested by the plurality of potential purchasers. FIG. 3 depicts such a qualified group offer 435 particularly as a qualified group offer responsive to users 435*b* (meaning potential purchasers).

Upon entering the electronic file 11, the potential purchaser may be presented with an option to choose the type of deal for which they are interested, as depicted in block 301 of FIG. 8. Block 303 depicts the presentment of the "make the deal" embodiment, in which one or more indications or purchase interests from different potential purchasers may be posted. Blocks 304 and 305 depict two other forms of deals as discussed elsewhere in this specification. At block 307 a potential purchaser may post an indication of interest in a particular good or service in the electronic file 11. This indication of interest may then be presented to other potential purchasers so that those potential purchasers may post an indication of purchase interest in that same good or service. In one embodiment, indications of purchaser interest may be solicited in a virtual room on the Web, so that a potential purchaser can post an indication of purchaser interest in a specific good or service and other potential purchasers may have access to the virtual room to post their indication of purchase interest in the specific good or service.

A potential purchaser who posts an indication of purchase interest in a good or service, including a potential purchaser who posts an indication of purchase interest for the same good or service as other potential purchasers, may be queried as to his or her status as a registered user, as depicted at block 309 of FIG. 8. If the potential purchaser is not a registered user, the potential purchaser may be required to register with the system proprietor, as represented in one embodiment in FIG. 4. If the potential purchaser is a registered user, the registration procedure may be bypassed, and the potential purchaser's purchase interest may be posted so that other potential purchasers can post an interest in the same good or service, as depicted in block 311 of FIG. 8.

b. Receiving an Offer and Closing the Deal

At block 313 of FIG. 8, the electronic file 11 may monitor the level of interest in posted indications of purchase interests for specific goods or services. If a large enough number of potential purchasers post an indication of purchase interest in a good or service (the number may vary from a few potential purchasers to several thousand), the level of purchase interest may be communicated to sellers of the good or service, as depicted in block 315 of FIG. 8. If a seller of the goods or services determines that it can offer a deal for the goods or services at the same or similar terms as requested by the potential purchasers, or perhaps even at substantially different terms, the seller of goods or services may offer a deal for the goods or services. Much like for the "show me the deal" embodiment, the seller of goods or services can more cheaply advertise for and/or offer the goods or services if a large number of potential purchasers have an interest in the good or service and the seller will be provided with information about those potential purchasers.

Block 317 of FIG. 8 indicates the act of posting an offer from a seller to the electronic file 11. At this point, a variety of procedures could be followed. In one embodiment, an indication of the offer could be posted in the electronic file 11 and the potential purchasers could be required to post an indication of purchaser interest in that offer to sign up for the deal. In another embodiment, all of the potential purchasers who previously posted an indication of purchase interest in the good or service could be automatically signed up for the deal, which is the embodiment depicted in FIG. 8. In yet another embodiment, all of the potential purchasers who posted an indication of purchase interest in the good or service could be notified of the pending offer by the seller, such as by email.

At block 319 of FIG. 8, an indication of the closing of a deal is posted to the electronic file 11. This indication of closing of the deal, which could also take the form of an email to potential purchasers, could include an opportunity for the potential purchasers to remove themselves from the deal, as indicated at block 321 and 323. If a potential purchaser chooses to remain a part of the deal, the deal may be closed, which may be effected by providing the profiles of the potential purchasers signed up for the deal to the seller of the goods or services, as depicted at block 325 of FIG. 8. In one embodiment, the acceptances of the seller's offer may be communicated to the seller and an exchange of payment from the potential purchaser to the seller and delivery by the seller may be initiated through the system.

Upon the closure of a deal, the status of the deal may be indicated to the potential purchasers signed up for the deal (block 327), and the profiles of those potential purchasers who signed up for the deal may be updated to reflect the new information (block 329). This act of updating may aid in keeping the profile of the potential purchaser up to date.

7. Targeted Commercial Messages

Figure 9:
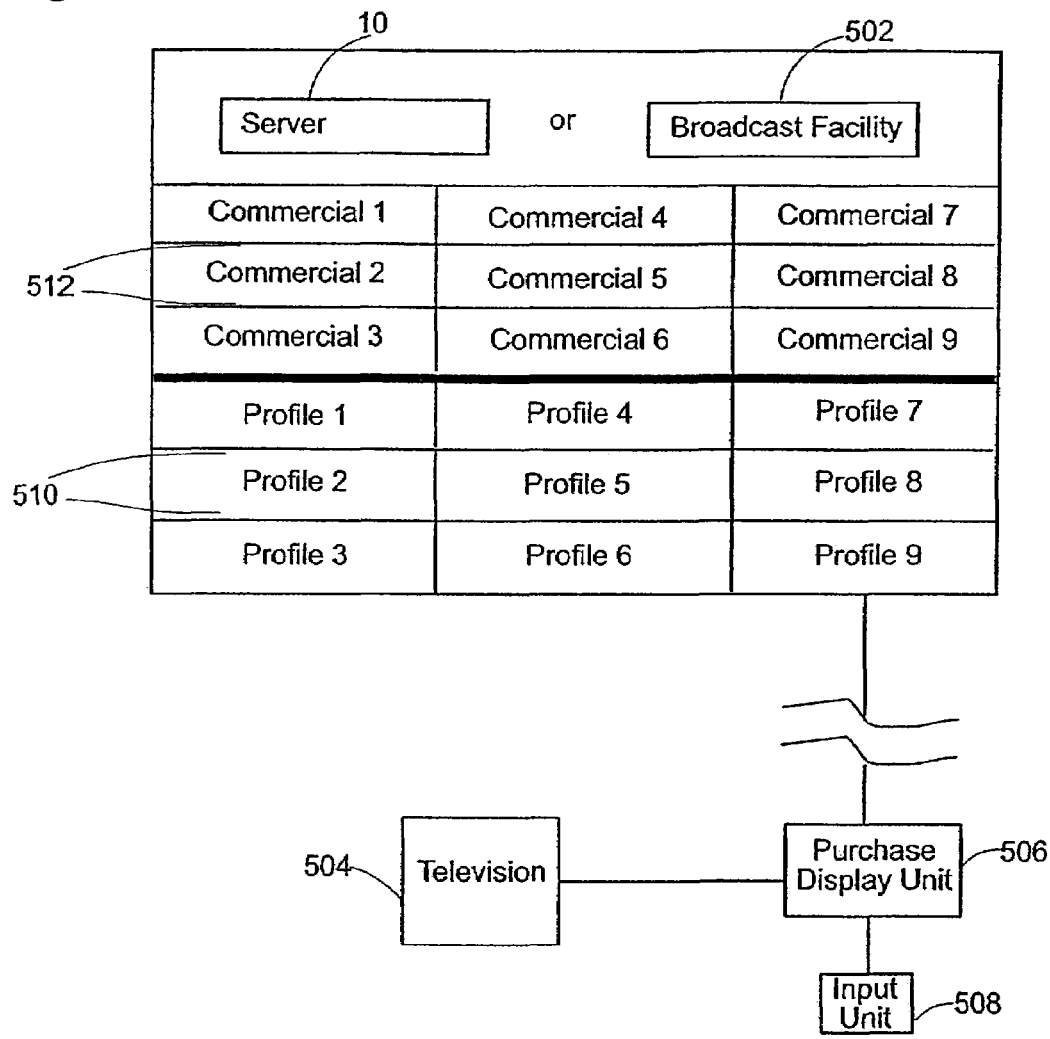
FIG. 9 is a depiction of the components for a targeted commercial message embodiment of the present invention.
Figure 10:
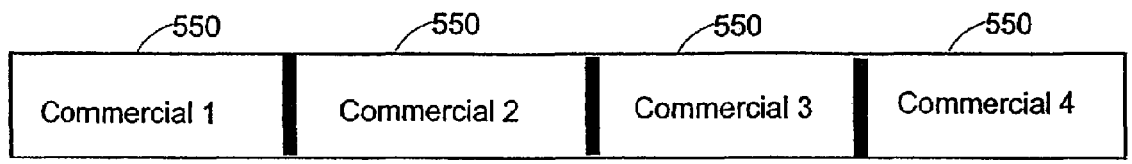
FIG. 10 illustrates the transmission of commercial messages over a communication path.
Figure 11:
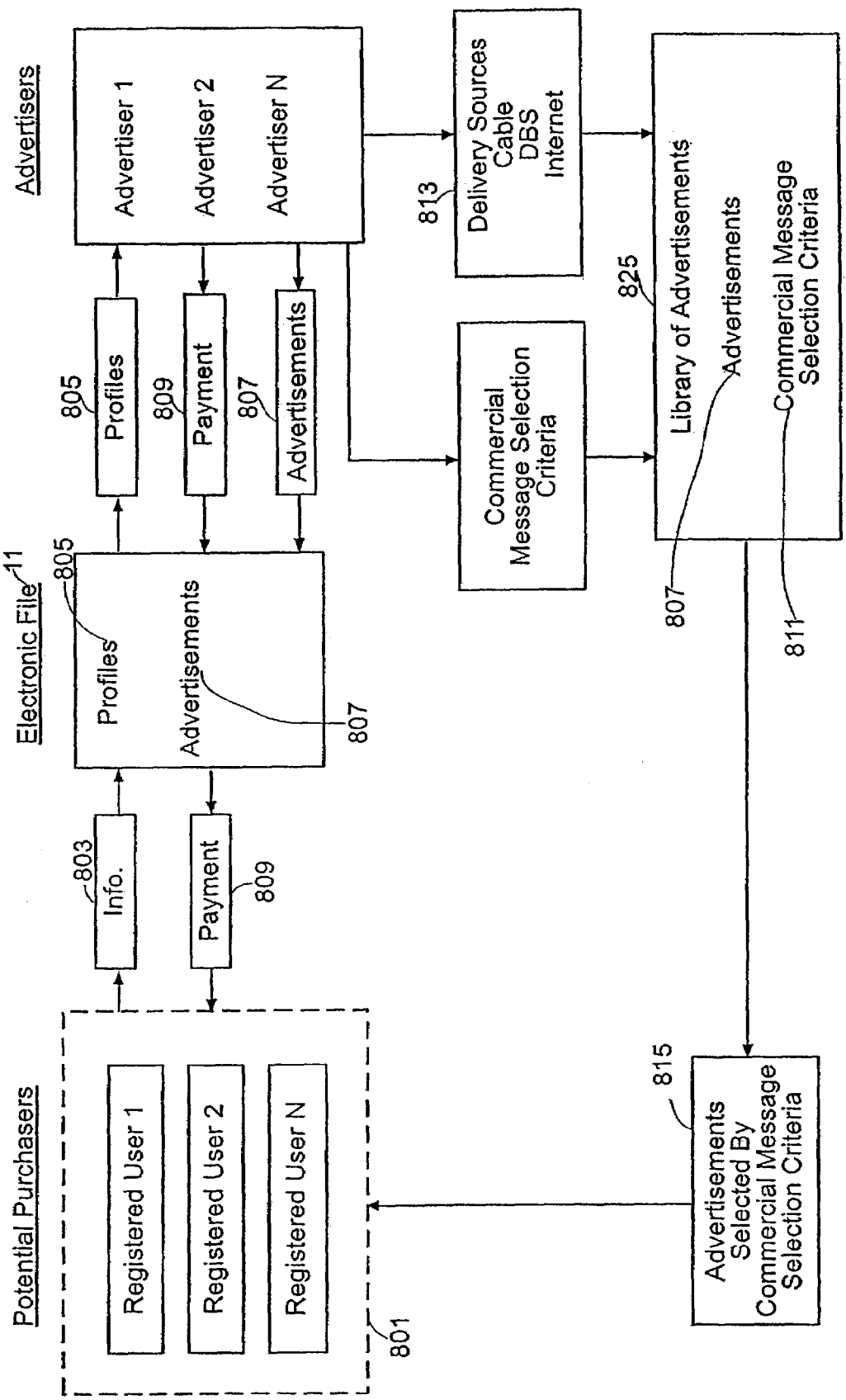
FIG. 11 illustrates one embodiment of a targeted commercial messages embodiment of the invention.

FIGS. 9-11 depict an embodiment of the invention which may be used for targeting of commercial messages. Throughout this specification, such commercial messages will be referred to as advertisements or commercial messages. The embodiment of FIG. 9 comprises the server 10 or a broadcast facility 502, a television 504 of a potential purchaser, a purchaser display unit 506, and an input unit 508 connected to the purchaser display unit 506. Although the server 10 and broadcast facility 502 are depicted as one entity, the server 10 and the broadcast facility may be separate entities. In one embodiment, the server 10 (in the electronic file 11 of FIG. 3) may contain the profiles 510 of the registered users (who are registered with the system proprietor as described above), and the broadcast facility 502 may contain a variety of commercials 512, which may be targeted toward different groups of potential purchasers. The server 10 and broadcast facility 502 are depicted as one entity, however, because one or both of these entities may contain both the profiles 510 of registered users and the commercials 512. The advertisements or commercial messages may be television or radio commercials, emails, or newspaper or magazine articles presented over the Internet.

FIG. 9 depicts one purchaser display unit 506, input unit 508, and television connected to the server 10 or broadcast facility 502, although, in reality, a large number of televisions 504, purchaser display units 506, and input units 508 may be connected to the server 10 or broadcast facility 502 over any standard communication path. The television 504 may be any standard television, although a computer or radio may also be used within the scope of the invention. The purchaser display unit 506 is a unit (which may be integral with the television 504 or separate from the television 504) which is adapted and designed to receive certain commercial messages from the server 10 or broadcast facility 502. In one embodiment, an input unit 508 is connected to the purchaser display unit 506 so that a registered user can control the commercial messages which may be displayed on his or her television.

The targeted commercial messages embodiment of the invention allows advertisers or a registered user to control the commercials that are displayed at a registered user's television 504. As an initial procedure, profiles of potential purchasers (who become registered users) may be gathered in the server 10 (or electronic file 11 of FIG. 3) as discussed above. These profiles may then be presented to advertisers of goods or services. In one embodiment, the profiles of the registered users will be presented to the advertisers based on the profile of a registered user. In other words, the profiles of only those registered users who meet certain criteria will be presented to the advertisers. In another embodiment, all or most of the profiles may be presented to an advertiser of goods or services, and that advertiser can then target those registered users who meet its criteria. Because privacy may be important to many registered users, in one embodiment information about registered users will only be provided to advertisers if specifically desired by the registered users.

Because an advertiser of a good or service may wish to target certain registered users for advertising, commercial message selection criteria may be developed for targeting registered users for certain commercial messages. Such commercial message selection criteria may be developed by individual advertisers or the system proprietor. Based on the demographic information in a registered user's profile, a set of commercial messages (one or more such messages) may be selected for that registered user. If a registered user has a large income and lives in an expensive neighborhood (which may be determined based on zip code), commercial messages geared toward such a purchaser, such as luxury cars, expensive jewelry, or expensive services, may be selected for that particular registered user. The commercial message selection criteria to make these determinations could be compiled in a number of different ways. Each commercial message could include necessary commercial message selection criteria, such as income or zip code requirements, gender preferences, or size of household, from which such determinations may be made.

The commercial message selection criteria may then be applied to the profiles to determine which registered users are suited to receive specific commercial messages. After the commercial message selection criteria are applied, specific commercial messages may be presented to registered users.

In one embodiment, the selection of commercial messages could take place at the registered user level through the purchaser display unit 506. In this embodiment, all commercial messages could be sent over the communication path to the purchaser display unit 506. FIG. 10 depicts commercial messages 550 being transmitted over a communication path to the purchaser display unit 506. The purchaser display unit 506 could then apply the commercial message selection criteria to the commercial messages to determine which messages are appropriate for the given registered user. In another embodiment, the purchaser display unit 506 could prompt for interactive input from the registered user (through the input unit 508), so that the registered user may select those commercial messages he or she wishes to view or hear. The registered user could make such selections based on a set of commercial message selection criteria for a group of commercial messages. In yet another embodiment, the registered user could provide input through the input unit 508 as to those types of messages he or she wishes to hear or view, and then only those specific types of messages could be transmitted over the communication path from the broadcast facility 502 or server 10 to the purchaser display unit 508.

In yet another embodiment, the application of the commercial message selection criteria to the commercial messages could take place at the server 10 or broadcast facility 502 level, so that only commercial messages applicable to a given registered user would be transmitted over the communication path to the registered user.

FIG. 11 builds off FIG. 3 and illustrates one embodiment of how a targeted commercial messages embodiment may function. Registered users, which are referred to collectively with numeral 801, provide information 803 to the electronic file 11 to register with the system proprietor as discussed above. Profiles 805 are then developed in the electronic file 11 in the method discussed above. Advertisers may present advertisements 807 to the electronic file 11. Upon payment 809 from an advertiser to the system proprietor, profiles 805 may be provided to the advertisers. In one embodiment, only profiles 805 having certain criteria are provided to the advertisers.

Advertisers may deliver advertisements 807 to a library of advertisements 825, which, in one embodiment, may exist on the server 10 in the electronic file 11 or at a broadcast facility 502 as depicted in FIG. 9 or, in another embodiment, at a purchaser display unit 506 of a registered user 801. FIG. 11 refers to such delivery with numeral 813, and notes that such delivery can take place through a variety of communication paths known to those skilled in the art, including cable, DBS, and the Internet. Individual advertisers may also provide commercial message selection criteria 811 to the library of advertisements 825 along with individual advertisements 807. These commercial message selection criteria 811 provide the criteria by which advertisers determine which registered users should be presented with different advertisements 807. For example, one commercial message selection criteria 811 for a specific advertisement 807 may specify that the advertisement is suited for registered users with a certain income level. Another commercial message selection criteria 811 for a specific advertisement 807 may specify that the advertisement is suited for registered users with a certain household size.

FIG. 3 depicts a delivery filter 460 adjacent the advertisements 437, 439, 441 that allows the advertisements 437, 439, 441 to be presented to certain targeted potential purchasers. Specific advertisements 807 (FIG. 11) may be selected for individual registered users 801 by comparing the commercial message selection criteria 811 for a specific advertisement 807 with the profile 805 for a registered user 801. FIG. 11 refers to such selected advertisements with numeral 815. In one embodiment, registered users 801 may be provided a payment 809 for viewing certain advertisements or, in one embodiment, a registered user 801 may be paid a set payment 801 each time he or she views or listens to an advertisement 807.

In one embodiment, specific advertisements 807 may be presented to a registered user 801 via email and such advertisements 807 may be presented based on the commercial message selection criteria 811 as explained above. These advertisements 807 may contain coupons and other information for the purchase of goods or services. In one embodiment, the registered user 801 may be compensated based on the amount of interaction with the email. For instance, the registered user 801 may be paid a certain amount of money for receiving the email (even if it is not viewed), an increased amount of money for opening an email, and a further increase in money for replying to the email with a question or expression of interest. In such embodiments, a feedback loop will provide the server 10 with information regarding whether the registered user 801 has received, read, or replied to an email. In another embodiment, a registered user 801 may be compensated based on the level of personal information provided by the registered user 801. For instance, a registered user 801 who has provided detailed information requested in a high level (as explained above) will be compensated at a greater rate than a second registered user 801 who has provided less detailed information (of a lower level). This compensation scheme may be combined with the compensation scheme based on the registered user's 801 degree of interaction with the email. Although these compensation schemes have been presented with specific reference to email commercial messages, such compensation schemes may also be used with other delivery messages, such as a television embodiment.

In another embodiment, where a number of commercial messages are available to be viewed or listened to by a potential purchaser, commercial messages may be presented to the potential purchaser based on the amount of money the commercial message will pay the potential purchaser. In other words, a high paying commercial message may be presented to a potential purchaser before a lower paying commercial message. In this manner, the advertisers who are willing to pay the greatest amounts for advertising have an increased opportunity to present advertisements to potential purchasers.

c. Summary

The present invention provides methods and systems for building profiles of potential purchasers for certain purposes, such as advertising. By pooling the profiles of potential purchasers, the potential purchasers may receive discount prices on goods or services, while the sellers or advertisers of those goods or services can save money on advertising because profiles of potential purchasers with interests in specific goods or services may be provided. Different embodiments have been presented, including an embodiment where an offer for goods or services is presented by a seller of the goods or services, contingent upon a set number of potential purchasers signing up for the deal within a given amount of time. Another embodiment allows potential purchasers to present indications of purchase interest in a specific good or service so that an offer may be solicited from one or more sellers of the goods or services. Yet another embodiment allows an advertiser or potential purchaser to target which commercial messages will be selected for a potential purchaser based on the potential purchaser's profile information.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

What is claimed is:

1. A method for delivery of targeted commercial messages, comprising:
    assembling a plurality of potential purchaser profiles in an electronic file, wherein assembling the plurality of potential purchaser profiles includes assembling purchaser-supplied information and assembling verified information, wherein assembling verified information includes:
        accessing at least one third party database and collecting purchase transactional information for the potential purchasers using the at least one third party database; and
        supplementing and identifying discrepancies in the purchaser-supplied information using the purchase transactional information;
    presenting the plurality of purchaser profiles in the electronic file to at least one potential advertiser of goods or services applicable to a substantial portion of the plurality of potential purchasers;
    developing commercial message selection criteria for selecting from potential purchasers those suited to receive a specified commercial message contained in a set of commercial messages;
    applying the commercial message selection criteria to the purchaser profiles to identify the potential purchasers suited to receive specified commercial messages; and
    presenting over a data network to a potential purchaser identified as suited, the specified commercial messages.

2. The method of claim 1 further comprising compensating the potential purchaser for reviewing specified commercial messages.

3. The method of claim 1 wherein the act of presenting is carried out using email.

4. The method of claim 3 further comprising compensating the potential purchaser for receiving specified commercial messages.

5. The method of claim 3 further comprising compensating the potential purchaser for viewing specified commercial messages.

6. The method of claim 3 further comprising compensating the potential purchaser for interacting with specified commercial messages.

7. The method of claim 3 further comprising compensating the potential purchaser based on a level of profile information provided by the potential purchaser.

8. An apparatus for delivery of targeted commercial messages, comprising:
    executable programs embedded in a computer readable medium when processed by a processor to execute:
        assembling a plurality of potential purchaser profiles in an electronic file, the plurality of potential purchaser profiles including both purchaser-supplied information and verified information, the verified information including collected purchasing transaction information for the potential purchasers from at least one third party database stored in a computer readable medium;
        supplementing and identifying discrepancies in the purchaser-supplied information using the purchase transactional information;
        presenting the plurality of purchaser profiles in the electronic file to at least one potential advertiser of goods or services applicable to a substantial portion of the plurality of potential purchasers;
        developing commercial message selection criteria for selecting from potential purchasers those suited to receive a specified commercial message contained in a set of commercial messages;
        applying the commercial message selection criteria to the purchaser profiles to identify the potential purchasers suited to receive specified commercial messages; and
        presenting over a data network to a potential purchaser identified as suited, the specified commercial messages.

9. The apparatus of claim 8 further including executable programs stored in a computer readable medium to compensate the potential purchaser for receiving specified commercial messages.

10. The apparatus of claim 8 further including executable programs stored in a computer readable medium to compensate the potential purchaser for viewing specified commercial messages.

11. The apparatus of claim 8 further including executable programs stored in a computer readable medium to compensate the potential purchaser for interacting with specified commercial messages.

12. The apparatus of claim 8, wherein the verified information includes third party verified information that is compared to the purchaser-supplied information.

13. The apparatus of claim 12, wherein the third-party verified information includes information from a database, stored in a computer readable medium, controlled by a third party.

14. The apparatus of claim 8, wherein the verified information includes self-verified information that is compared to the purchaser-supplied information.

15. The apparatus of claim 14, wherein the self-verified information includes behavioral information.

16. The apparatus of claim 8, further comprising executable programs stored in a computer readable medium to present the specified commercial messages over the data network to the potential purchaser in conjunction with content.

* * * * *